H. L. PALMER,

Assignor by mesne assignments to THE CONSOLIDATED LINING COMPANY.

APPARATUS FOR LINING PAPER BOARD.

No. 9,905. Reissued Oct. 18, 1881.

Witnesses
Otto Hufeland
William Miller

Henry L. Palmer.
Inventor
by Van Santvoord & Hauff
his att'ys

UNITED STATES PATENT OFFICE.

HENRY L. PALMER, OF BROOKLYN, ASSIGNOR, BY MESNE ASSIGNMENTS, TO THE CONSOLIDATED LINING COMPANY, OF NEW YORK, N. Y.

APPARATUS FOR LINING PAPER-BOARD.

SPECIFICATION forming part of Reissued Letters Patent No. 9,905, dated October 18, 1881.

Original No. 87,359, dated March 2, 1869; Reissue No. 4,951, dated June 18, 1872; Reissue No. 5,471, dated July 1, 1873; Reissue No. 7,517, dated February 20, 1877; Reissue No. 8,883, dated September 2, 1879. Application for reissue filed September 13, 1881.

*To all whom it may concern:*

Be it known that I, HENRY L. PALMER, of Brooklyn, Kings county, and State of New York, have invented a new and useful invention for the purpose of uniting paper to what is known in the trade and mechanical uses as "pasteboard," whether made of straw or other materials, of which the following is a specification.

Previous to this invention continuous sheets of paper-board had been lined with continuous sheets of thin paper by machinery, which applied the paste to the thin paper, united the same with the board, and then dried the united layers by means of a drying-cylinder; also, board had been built up of continuous sheets of paper pasted and pressed together by machinery; also, board had been built up of continuous sheets of wet or damp pulp pressed together and afterward dried; but prior to my invention no machine had ever been organized capable of practically lining the small commercial sheets of boards with thin lining-paper by machinery. This work has been heretofore done by hand. The drying has been accomplished by exposure to the atmosphere, and the work, when done, is liable to warp and to be rough and uneven, and the process is slow and expensive. I propose to save by this invention this hand manipulation, with an economy of cost of paper and labor, and with the production of the material in a superior condition; and I do hereby declare that the following is a true and full description of the construction and operation of the invention, reference being had to the annexed drawings, making part of this specification.

Figure 1:
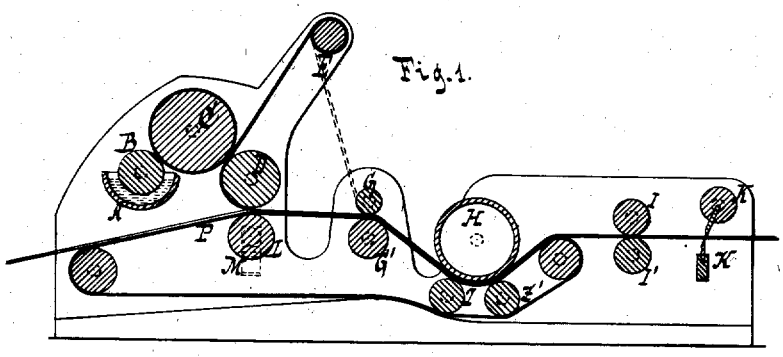
Figure 2:
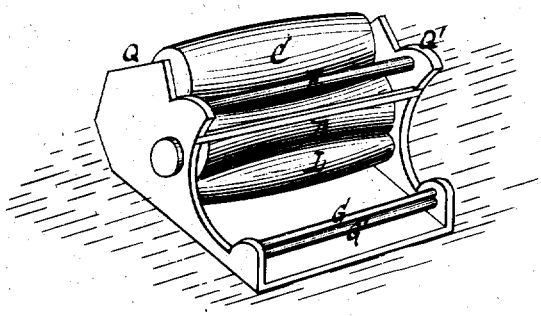

Figure 1 represents a vertical longitudinal section of the machine, and Fig. 2 represents a perspective view of a portion of the machine.

Similar letters indicate corresponding parts.

A is a paste-reservoir. B is a paste-roll arranged to revolve in said reservoir. C is a distributing-roll arranged to revolve with the paste-roll B, and separated from said roll by a film of paste.

D is a feeding press-roll, for pressing, pasting, and feeding the thin lining-paper. It is caused to revolve on its axis by the motive power of the machine by means of a belt, its circumference moving at substantially the same speed as the pressing or uniting roll L or the drying-cylinder H, and in connection with the distributing-roll C, between which and the roll D the paper passes to receive the paste from roll C, and by the resistance of which the paste is forced against the paper and the paper is fed forward.

L is a self-adjusting pressing roll under the roll D, between the upper surface of which and the lower surface of the roll D the two layers of paper and a continuous belt of felt, P, pass, and by the pressure of which the two layers of paper are united. The adjusting-springs are seen at M.

G G′ are also pressing-rollers, between which the felt and the two layers of paper are caused to pass.

H is a drying cylinder or roll, into which steam or heated air is introduced for the purpose of drying the two layers of paper as they pass under its surface, being pressed against it by pressing-rolls Z Z′.

I I′ are calender-rolls, and K K′ are revolving knives for cutting the united and dried paper into sheets.

The roll of thin paper to be supplied with paste is hung on the roll E, which has bearings in the sides of the frame.

I do not confine myself to the use of concave and convex rollers B C D L, but can use cylindrical in their place.

To revolve the rolls I have applied pulleys on the end of the shafts, to which the rolls D and H and K are attached, and have connected them by belts, the other rolls being revolved by frictional contact with the felt or paper or the adjacent rolls.

The operation is as follows: Paste is supplied to the reservoir A in such quantity and consistency that it will be taken up by the roll B as it revolves and be carried between the rollers B and C, where it is pressed and deposited on the surface of the roll C in a uniform film. It is then carried on the surface of the roll C to the paper which is passing between rolls C and D from a roll hung on the shaft E, and deposited on it by the pressure-roll D. The pasteboard is fed in sheets and carried forward by the felt P to the under side of the roller D, where it meets the paper. The two materials are then passed through with the felt between rollers D and L, the spring M accommodating for any difference there may be in the thickness of the pasteboard or paper. The object of the concave and convex rollers is seen at this point by giving a rounding or convex form to the surface to which the paper is applied to compensate for any contraction of the wet paper. The material then passes forward, in the direction indicated by the arrows, between rollers G G′, where it receives additional pressure around the drying-cylinder H, where it is dried; thence through the calenders I I,′ where it is smoothed and straightened; thence between knives K K′, which will sever the sheets or cut them to any desired length.

If it be desired to paste the board instead of the paper, it will be done by changing the direction of the paper and bring it directly from E to G G′, as indicated by the dotted lines in Fig. 1. The pasteboard coming from between the rollers D and L, where it has been pasted, meets the paper between G G′, after which it will proceed as in Fig. 1.

I do not claim the drying-cylinder H, calenders I I′, or the knives K K′; but I claim them only in combination with the other parts specified.

It will be seen, from the above description of the construction and operation of my improved machine, that said machine is capable both of lining continuous sheets of straw-board or other thick material, and also the short commercial sheets of such material, and that its organization is especially adapted to the latter purpose. It will also be observed that for such last-named purpose the employment of a suitable guide or platform to support, guide, and direct the separate sheets of thick material in between the pressing or uniting rollers D L, and also of a guide or conveyer to support and carry said sheets from said rolls to the drying-rolls, is an essential requisite, and that, in connection with such guides and supports for the purpose of properly holding and guiding the sheets of thick board, and in connection with means for applying the paste, pressing the two sheets together, and subsequently drying them, some suitable means for supporting the thin lining-paper and guiding it properly to the apparatus which applies the paste to it and to the straw-board to which it is to be united is also an essential requisite.

In the machine herein shown the guiding of the thick board is accomplished by the felt P, which, for that purpose, is arranged in so nearly a horizontal position as to perform the function of supporting the separate sheets as they are fed into and through the machine, which is also essential where the thick paper is not continuous; but if the thin lining-paper be fed in continuous sheets it is not necessary to guide it from or upon a horizontal support, as it will in that case be properly directed and guided from a roll placed in any suitable position, as at E.

What I claim as new, and desire to secure by Letters Patent, is—

1. The method, substantially as hereinbefore described, for uniting sheets of pasteboard to a continuous sheet of paper by advancing the sheet of paper automatically and delivering the sheets of pasteboard successively to suitable mechanism for bringing the same in contact with the sheet of paper, either the paper or the pasteboard being supplied with paste previous to their coming in contact with each other.

2. The combination, substantially as hereinbefore described, of the compressing distributing-roller and the roller D, between which the paper is passed to receive a film of paste.

3. The combination, substantially as hereinbefore described, of the compressing distributing-roller and the roller between which the sheet is passed to receive a film of paste, of the endless apron for carrying the board, and the compressing-roller for causing the surfaces of the paper and pasteboard to adhere.

4. The combination, substantially as hereinbefore described, of mechanism for applying a film of paste to the surface of the paper, the endless apron, the compressing-rollers, and the drying-cylinders.

5. The combination, substantially as hereinbefore described, of the paste-reservoir, the paste-roll, the distributing-roll, the feeding press-roll for feeding, pasting, and pressing the thin lining-paper, and the roll for bringing the pasteboard in contact with the lining-paper and uniting them.

6. The combination, substantially as hereinbefore described, of the paste-reservoir, the paste-roll, the distributing-roll, the feeding press-roll, for feeding, pasting, and pressing the thin lining-paper, the roll for bringing the pasteboard in contact with the lining-paper and uniting them, and the drying-cylinder.

7. The combination, substantially as hereinbefore described, of the pasting mechanism, the press-rolls, the drying-rolls, and suitable means for supporting and guiding the sheets of pasteboard and the lining-paper in their passage to and through the machine, whereby the short commercial sheets of pasteboard are enabled to be practically fed to and through the machine and to be lined with a thin fabric on their passage through it.

In testimony whereof I have hereunto set my hand and seal in the presence of two subscribing witnesses.

HENRY L. PALMER. [L. S.]

Witnesses:
ARTHUR COCHRAN,
GEO. F. HAMLIN.